United States Patent [19]
Lowdermilk

[11] 4,322,017
[45] Mar. 30, 1982

[54] DISPENSING DEVICE
[76] Inventor: Charles H. Lowdermilk, 4411 Pennydale Dr., Greensboro, N.C. 27407
[21] Appl. No.: 98,486
[22] Filed: Nov. 29, 1979
[51] Int. Cl.³ .............................................. B67D 5/22
[52] U.S. Cl. ................................... 222/43; 222/217; 222/242; 222/362
[58] Field of Search ................. 222/43, 49, 50, 217, 222/222, 242, 239, 305, 307, 308, 339, 361, 362, 367, 370, 284; 221/264, 265

[56] References Cited
U.S. PATENT DOCUMENTS

| | | | |
|---|---|---|---|
| 1,204,111 | 11/1916 | Anderson | 222/239 |
| 1,286,223 | 12/1918 | Bunnell | 222/239 |
| 2,002,039 | 5/1935 | McPhee | 222/284 |
| 2,191,928 | 2/1940 | McVicker | |
| 2,204,821 | 6/1940 | Priddy | 222/362 |
| 2,446,582 | 8/1948 | Gopner | 222/308 |
| 2,944,707 | 7/1960 | Steinmetz | 222/254 |
| 3,129,853 | 4/1964 | Hoskins | 222/339 |
| 4,032,050 | 6/1977 | Funk | 222/284 |

FOREIGN PATENT DOCUMENTS

| | | | |
|---|---|---|---|
| 316453 | 8/1929 | United Kingdom | 222/239 |

*Primary Examiner*—H. Grant Skaggs

[57] ABSTRACT

A dispensing device is provided herein for dispensing a selected amount of material from a container. The device includes a central disc which rotates to deliver a desired amount of material according to a pre-set adjustment. Total emptying of the container is assured due to the conically shaped hub member and the arcuate interior walls of the dispensing device.

9 Claims, 7 Drawing Figures

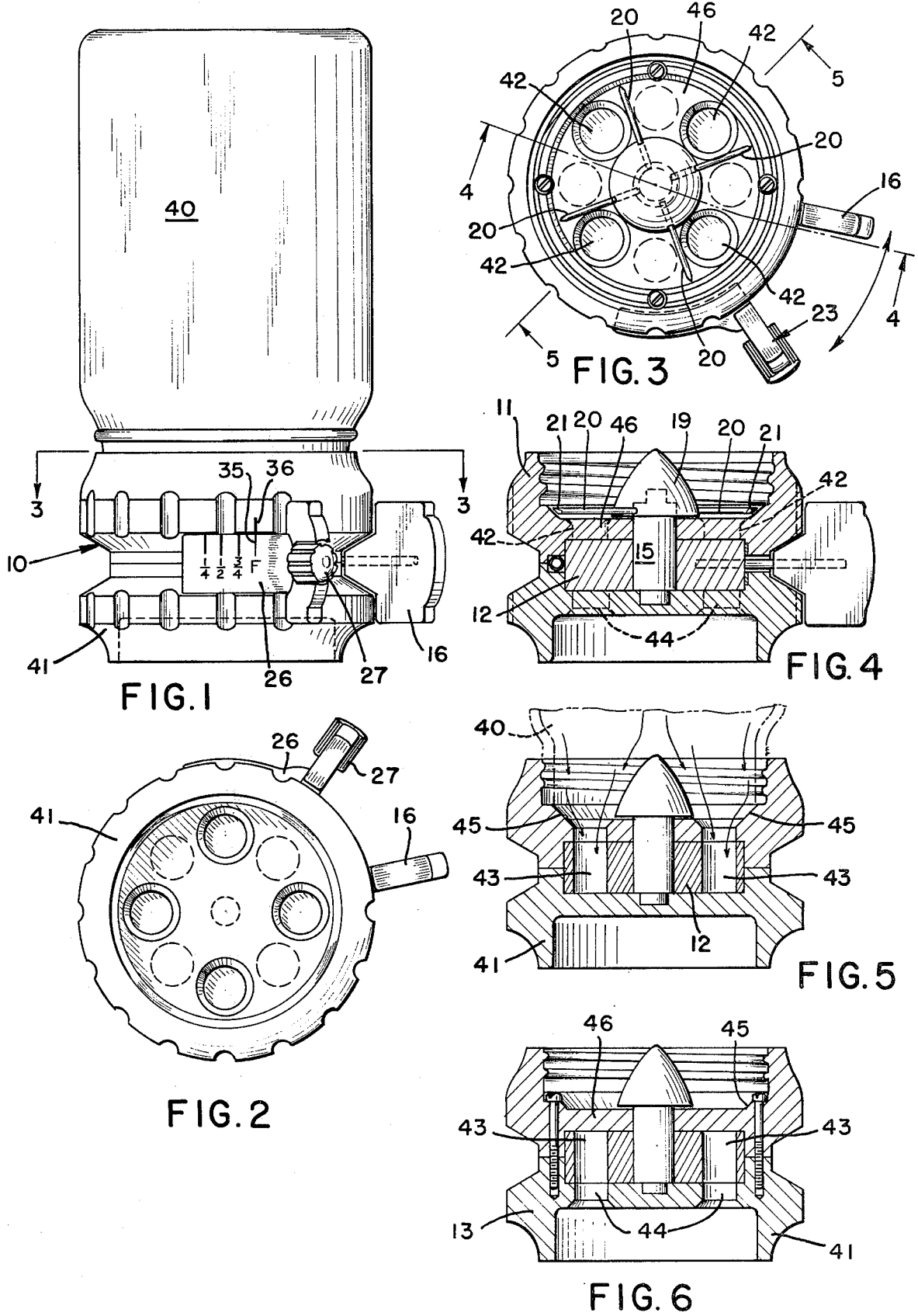

DISPENSING DEVICE

BACKGROUND AND OBJECTIVES OF THE INVENTION

Dispensing apparatus for granular materials are well known in the prior art and such prior art devices teach mechanisms whereby varying amounts of materials are delivered at the users' option. Certain apparatus made in the past include sealing means to prevent moisture from affecting the remaining materials although varying degrees of success have been achieved with the previously conceived dispensers.

Therefore it is an objective of the present invention to provide a dispensing device which will dispense a preselected amount of materials in an accurate manner while preventing the moisture in the air to reach or affect the remaining materials.

It is another objective of the present invention to provide a dispensing device which will empty totally under normal operating conditions and which will not have to be tilted or shaken to rid the dispenser of any residual amounts.

It is still another objective of the present invention to provide a dispensing device which is easily adjustable to dispense varying quantities of materials as required.

SUMMARY OF THE INVENTION AND DESCRIPTION OF THE PREFERRED EMBODIMENT

The present invention provides a dispensing device which can be attached to a container having granular or other suitable materials therein. The dispensing device of the preferred embodiment includes for accurate delivery of a pre-determined amount of material and for total emptying an upper material receiving portion, a central disc means and a lower terminal portion. The upper portion of the dispensing device includes a base having apertures therein which fill with the granular material of the container. The central disc means includes a series of conduits which are aligned under the apertures of the upper portion when the disc means is in the material receiving position. A lever is attached to the disc means whereby the disc means can be rotated by finger pressure to a material dispensing position at which the conduits then align with the openings of the lower terminal portion thereby allowing the material contained within the disc means conduits to be dispensed. As finger pressure is removed from the lever of the disc means a resilient member urges the disc means to return in an opposite direction to the material receiving position. In delivering a full measure of materials the central disc means rotates approximately 45°. An adjusting means is available to limit the travel of the disc means to deliver lesser measures as desired. To insure that the apertures of the upper material receiving portion are filled before dispensing a center post member joined to the central disc passes through the base of the upper material receiving portion and includes sweep means with contoured peripheral ends which rotate above the base with the central disc to push additional materials into said apertures. The inner walls of the upper material receiving portion are arcuately formed whereby the dispensable material will not collect in the corners of the upper portion but will gravity feed towards the apertures. Additionally, the center post member which extends through the upper material receiving portion has a conically shaped hub member to direct the dispensable material also toward the apertures of the upper material receiving portion.

DESCRIPTION OF THE DRAWINGS

FIG. 1 shows a dispensing device and material container;

FIG. 2 is a bottom view of the dispensing device of FIG. 1;

FIG. 3 is a top view of the dispensing device of FIG. 1 with the container removed;

FIG. 4 is a cross sectional view along lines 4—4 of FIG. 3;

FIG. 5 is another cross sectional view taken through lines 5—5 of FIG. 3;

FIG. 6 is yet another cross sectional view of the dispensing device but with the conduits of the central disc means aligned with openings of the lower terminal portion.

For a more detailed description of the invention, FIG. 7 illustrates dispensing device 10 having an upper material receiving portion 11, a central disc means 12 and a lower terminal portion 13. Upper material receiving portion 11 is rigidly affixed to lower terminal portion 13 by securing members 14. As would be understood central disc means 12 rotates between upper material receiving portion 11 and lower terminal portion 14 during operation. Center post member 15 is affixed to central disc means 12 whereby rotation of central disc means 12 also causes center post member 15 to rotate. Rotation of central disc means 12 is accomplished by finger pressure applied to lever 16. During rotation resilient means 17 shown herein as a coiled steel spring is compressed by disc stud 18 whereby removal of the finger pressure on lever 16 causes resilient means 17 to urge disc 12 in an opposite direction and to thus return to its original material receiving position.

Figure 7:
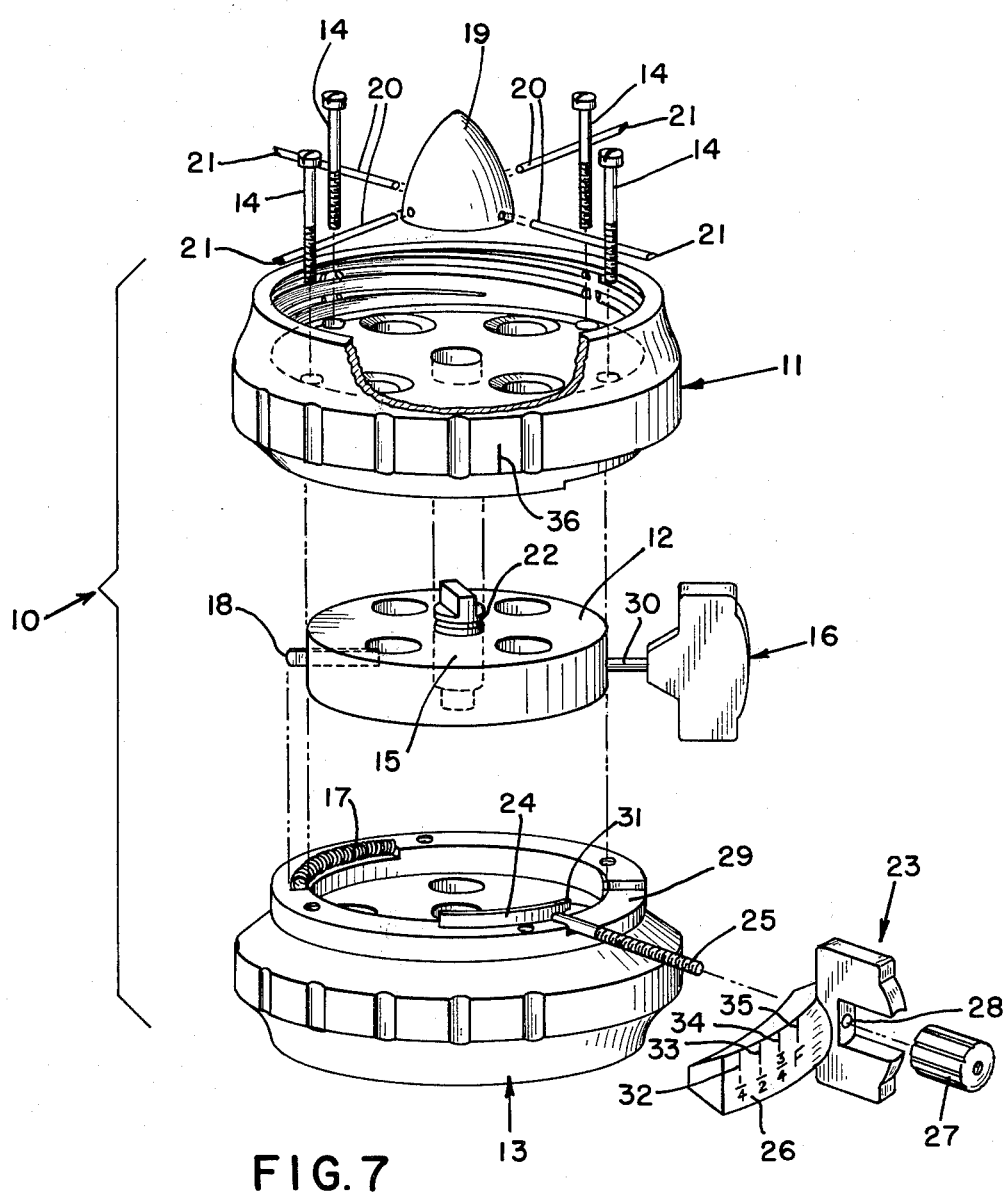
FIG. 7 is an exploded view of the preferred embodiment of the dispensing device.

Hub member 19 as shown in FIG. 7 is conically shaped and serves as a mounting station for sweep means 20. Sweep means 20 have contoured peripheral ends 21 as will be explained in more detail below. Sweep means 20 pass through hub member 19 and into groove 22 of center post member 15 to secure hub member 19 and center post 22 in firm engagement.

Lower terminal portion 13 is shown in FIG. 7 with an adjusting means 23 in disassembled form. Adjusting means 23 consists of pressure plate 24, threaded dowel 25, scaled slide 26 and adjusting knob 27. Adjusting knob 27 is tightened after adjustment to limit the movement of central disc means 12. As adjusting knob 27 is turned in a clockwise direction threaded dowel 25 is urged through opening 28 to thereby increase the frictional contact between pressure plate 24 and the interior of wall 29. Thus, with adjusting knob 27 tightened the clockwise movement of lever 16 is terminated as lever pin 30 contacts end 31 of pressure plate 24. End 31 may be formed in a concave manner to better receive cylindrical lever pin 30 shown in FIG. 7.

As would be understood by those skilled in the art as scaled slide 26 is moved in a counter-clockwise direction lever 16 would have its clockwise directional movement accordingly reduced. For example, if line 32 on scaled slide 26 were aligned with indicator line 36 then lever 16 would have its clockwise mobility reduced whereby only ¼ of the total available material would be dispensed per rotation of disc means 12.

In operation dispensing device 10 is attached to a jar or container 40 as shown in FIG. 1 which may be filled with instant coffee, tea, sugar or other granular or finely divided materials. A suitable wall bracket (not shown) can be used to attach the container and dispenser to a wall or shelf as required. Thereafter adjusting knob 27 is loosened and scaled slide 26 positioned; for example, at the "F" alignment as shown in FIG. 1. Adjusting knob 27 is then tightened and a cup or other container is placed under skirt means 41 of dispensing device 10. Finger pressure is then applied to lever means 16 to rotate central disc means 12 in a clockwise direction whereupon the material is passed into a suitable container (not shown) below skirt means 41 such as a coffee cup.

To better explain the operation of central disc means 12, in FIG. 3 apertures 42 align directly over conduit means 43 of central disc means 12 as further shown in cross sectional view in FIG. 5. Thereafter as lever means 16 is pushed in a clockwise direction towards adjusting means 23 central disc means 12 rotates in a clockwise direction thus allowing conduit means 43 to align with openings 44 in lower terminal portion 13 as shown in FIG. 6 whereupon the material retained in conduit means 43 will fall and pass through openings 44 into a cup or other container thereunder.

In FIG. 4 central disc means is shown in an intermediate position between the positions as shown in FIGS. 5 and 6. Thus, as shown in FIG. 4 there is no communication between the conduit means 43 and apertures 42 or lower openings 44.

The total removal from dispensing device 10 of the material is demonstrated by FIG. 4 as the lower portion of hub member 19 abuts the apertures 42 and would thereby guide any material located in the central portion of container 40 into apertures 42. Also, sweep means 20 are shown with contoured peripheral ends 21 which barely clear the interior arcuate wall surface 45 during movement. Thus, the combination of the arcuate slope of interior wall 45 of upper material receiving portion 11, the contoured peripheral ends 21 of the sweep means and the sharply contoured hub member 19 in conjunction with the placement of sweep means 20 just above base 46 allows for substantial total removal of material from the container 40 through dispensing device 10.

Dispensing device 10 may be made from a variety of suitable materials including polyethylene or polycarbonate resins, stainless steel or other metals and plastics.

The examples and descriptions are shown herein for illustrative purposes and are not intended to limit the scope of the present invention.

I claim:

1. A dispensing device comprising: an upper material receiving portion having a base, said base having an aperture therein, a lower terminal portion having an opening therein, said material receiving portion and said terminal portion being rigidly affixed relative to each other, a central disc means, said disc means including a material conduit, said disc means being rotatably positioned between said material receiving portion and said terminal portion, a center post member joined to said disc means for rotation therewith, said center post member including an upper end, said upper end extending through said base, a hub member, said hub member being conically shaped and attached to said upper end of said center post member, sweep means, said sweep means affixed to said hub member, said disc means rotatable from a receiving to a discharging position, an adjusting means, said adjusting means proximate to and for adjustably limiting the rotation of said disc means, said adjusting means including a pressure plate having a dowel member joined thereto, a resilent member, said resilent member contacting said disc means whereby said disc means is urged from said discharging to said receiving position.

2. A dispensing device as claimed in claim 1 wherein said upper material receiving portion includes an arcuate wall contiguous with said aperture of said base.

3. A dispensing device as claimed in claim 1 wherein said hub member is contiguous with said aperture of said base.

4. A dispensing device as claimed in claim 1 wherein said disc means includes a lever for rotating said disc.

5. A dispensing device as claimed in claim 1 wherein said dowel member has an adjusting knob attached thereto.

6. A dispensing device as claimed in claim 1 wherein said adjusting means includes a dispensing scale.

7. A dispensing device as claimed in claim 1 wherein said sweep means affixes said hub member to said center post member.

8. A dispensing device as claimed in claim 1 wherein said sweep means has a contoured peripheral end.

9. A dispensing device comprising: an upper material receiving portion having a base, said base having an aperture therein, a lower terminal portion having an opening therein, said material receiving portion and said terminal portion being rigidly affixed relative to each other, a central disc means, said disc means including a material conduit, said disc means rotatably positioned between said material receiving portion and said terminal portion, a center post member joined to said disc means for rotation therewith, a lever attached to and for rotating said disc means, a moveable adjusting means including a pressure plate having a dowel member joined thereto, said adjusting means proximate to and for adjustably limiting the rotation of said disc means and said disc means rotatable from a receiving to a discharging position.

* * * * *